United States Patent [19]

Hieble

[11] Patent Number: 5,094,468
[45] Date of Patent: Mar. 10, 1992

[54] CYLINDER HEAD GASKET WITH REINFORCING PLATE BETWEEN CYLINDER OPENINGS

[75] Inventor: Franz Hieble, Senden-Aufheim, Fed. Rep. of Germany

[73] Assignee: Reinz-Dichtungs-Gesellschaft mit beschrankter Haftung, Neu-Ulm, Fed. Rep. of Germany

[21] Appl. No.: 545,950

[22] Filed: Jul. 2, 1990

[30] Foreign Application Priority Data

Jul. 6, 1989 [DE] Fed. Rep. of Germany ....... 3922284

[51] Int. Cl.$^5$ .................. F16J 15/12; F02F 11/00
[52] U.S. Cl. .................. 277/235 B; 277/235 R; 277/227; 277/233; 277/234
[58] Field of Search .......... 277/227, 233, 234, 235 B, 277/235 R, 236

[56] References Cited

U.S. PATENT DOCUMENTS

| | | |
|---|---|---|
| 1,793,423 | 2/1931 | Fitzgerald ................. 277/235 B |
| 1,793,425 | 2/1931 | Fitzgerald ................. 277/235 B |
| 1,903,990 | 4/1933 | Fitzgerald ................. 277/235 B |
| 3,653,673 | 4/1972 | Green ........................... 277/227 |
| 4,330,585 | 5/1982 | Eyrard et al. ............. 277/235 B X |
| 4,451,051 | 5/1984 | Nicholson ................. 277/235 B |
| 4,688,809 | 8/1987 | Deppe ..................... 277/236 X |

FOREIGN PATENT DOCUMENTS 0028576  5/1981  European Pat. Off. ........ 277/235 B

Primary Examiner—William A. Cuchlinski, Jr.
Assistant Examiner—J. Folker
Attorney, Agent, or Firm—Fleit, Jacobson, Cohn, Price, Holman & Stern

[57] ABSTRACT

A cylinder head gasket with at least two juxtaposed passage openings separated by a web is described and which is provided in the web area with a metallic reinforcement. The reinforcement has a cross-section tapering in the longitudinal direction of the web at least on one side. It preferably comprises a crimped sheet metal body.

5 Claims, 2 Drawing Sheets

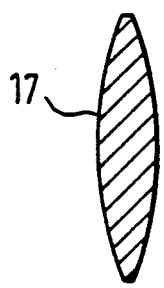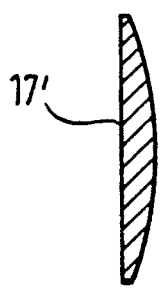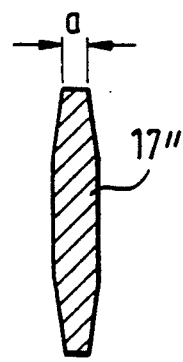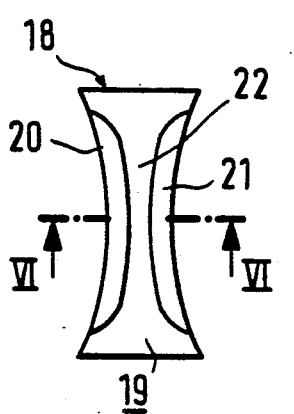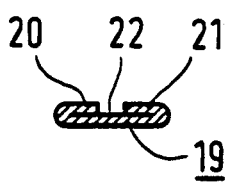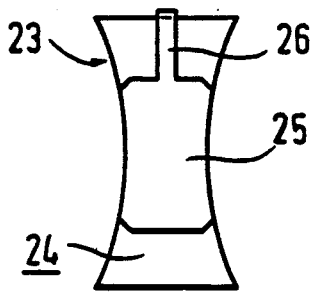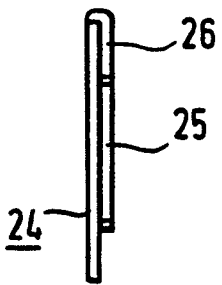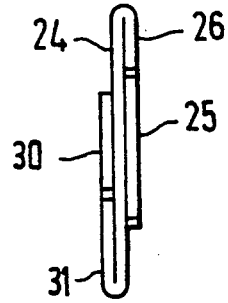

CYLINDER HEAD GASKET WITH REINFORCING PLATE BETWEEN CYLINDER OPENINGS

BACKGROUND OF THE INVENTION

The invention relates to a cylinder head gasket with a gasket plate having at least two juxtaposed passage opening separated by a web, as well as with metallic, circular reinforcing borders of said passage opening and with a metallic, lamina-like reinforcement located in the web area.

The gasket plates of such cylinder head gaskets are normally made from a soft material, which can be reinforced with a metal carrier. All-metal gasket plates are also known. Under the sealing pressure the gasket plate must deform to such an extent that when fitted in an internal combustion engine the adaptation to the sealing faces necessary for sealing purposes is obtained. The cross-sectionally U-shaped borders bent over the opening rim and which have to ensure the necessary sealing against the high combustion chamber pressures serve to produce a locally increased contact pressure. In addition, said border has the function of shielding the soft material against the hot combustion gases.

The compact construction of modern internal combustion engines leads to limited distances between the passage opening or cylinders and consequently the web widths are small. This leads to the sealing material being located there to a greater extent than in the remaining areas, i.e. the contact pressure drops and there is a risk of a gas exchange between the cylinders. This can lead to a destruction of the gaskets in this area and therefore to an engine failure.

This effect is counteracted by increasing the gasket thickness and the metallic proportion in the thermally endangered web areas by using a lamina-like reinforcement. The metal also brings about a better heat dissipation to the adjacent components. It is a common feature of all known solutions that the reinforcements have a constant thickness and the thickness, position and geometry adapted to the web shapes are dependent on engine-specific factors. At the front ends of the reinforcements there is an abrupt bend corresponding to the thickness thereof and in the fitted state this leads to a sudden pressure drop or in the extreme case to a gap between the sealing faces.

A further disadvantage of the known reinforcements is that, as a result of the predetermined geometry of the sealed engine parts pressed together by means of socket head studs, the cylinder head is supported in preferred manner on the flat reinforcement in the said area and leads to a pressure reduction there.

SUMMARY OF THE INVENTION

The object of the invention is to provide a cylinder head gasket of the aforementioned type, which has an improved sealing action in the web area.

This object is achieved in that the reinforcement has an at least one-sided, tapering cross-section in the web longitudinal direction to both ends and that the greatest thickness is in the vicinity of the greatest constriction of the web.

The invention has the advantage that the pressure concentration is distributed in planned manner in such a way that there is a substantially continuous transition between the reinforcement and the remaining areas. It would fundamentally appear to be adequate for the flattening of the reinforcement to only occur on one side, although a two-sided cross-sectional decrease is particularly advantageous.

Instead of a continuous cross-sectional reduction, it is appropriate for the reinforcement to be stepped. This further development has the advantage that the reinforcement can be produced in simple manner by sheet metal layers.

According to a further preferred development, the reinforcement comprises a sheet metal body with crimped over edges, which are shorter than said body.

Particularly in the case of engines which have a longitudinal slot in the web area for cylinder cooling purposes, it is advantageous for the longitudinally crimped over edges to terminate at a predetermined distance from one another for the formation of the slot.

As an alternative to the longitudinally crimped over edges according to the invention it is also possible that at least on one front face there is a crimped over, narrow positioning and mounting web for a support in the vicinity of the maximum web constriction. In order to obtain a two-sided support, it is appropriate to provide on both front faces an oppositely crimped over positioning and mounting web with support.

All such embodiments provided with a fold or crimp-over have the advantage that the reinforcement can be produced in a simple manner and in one piece by punching and crimping.

According to another development of the invention, the circular reinforcing bordering of the passage openings is provided in the web area with a correspondingly shaped widening, which in accordance with the preceding embodiments can be formed in to a layerwise reinforcement by crimping over.

The invention is described in greater detail hereinafter relative to several embodiments shown in the drawings.

BRIEF DESCRIPTION OF THE DRAWINGS

FIGS. 2 to 4 diagrammatically shows a longitudinal cross-section of the reinforcement along Section Line II—II through the reinforced web area of the cylinder head gasket according to FIG. 1 for three different embodiments.

FIG. 5 shows a plan view of a first embodiment of a crimped-over reinforcement.

FIG. 6 shows a cross-section through the reinforcement according to FIG. 5 along the section line VI—VI.

FIG. 7 diagrammatically shows a plan view of a second embodiment of a crimped-over reinforcement.

FIG. 8 shows a side view of the reinforcement according to FIG. 7.

FIG. 9 shows a side view of another embodiment of the reinforcement according to FIG. 7.

DESCRIPTION OF THE PREFERRED EMBODIMENTS

Figure 1:
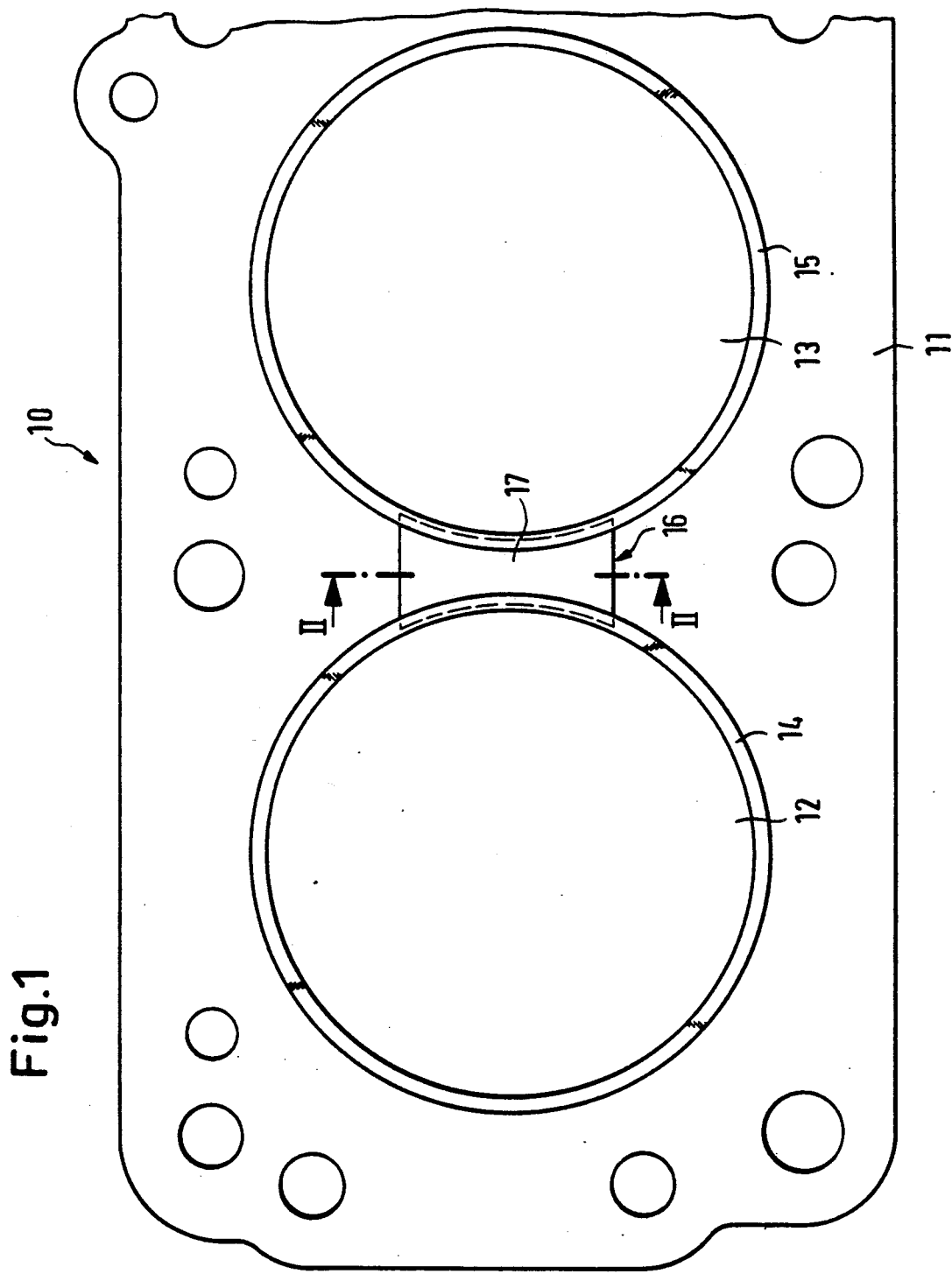
FIG. 1 diagrammatically shows a plan view of part of a cylinder head gasket.

The cylinder head gasket 10 shown in FIG. 1 comprises a soft material gasket plate 11, which is provided with two juxtaposed passage openings 12, 13. The edges of the passage openings 12, 13 are provided with metallic, cross-sectionally U-shaped combustion chamber reinforcing borders 14, 15.

Between the two passage openings 12, 13 is provided a web 16, on which engages a metal reinforcement 17, whose longitudinally directed edges are adapted to the shape of the passage openings 12, 13 of the combustion chamber borders 14, 15. The reinforcement 17 is held by the projecting U-legs of the combustion chamber borders 14, 15.

The cross-section of FIG. 2 illustrates for a first embodiment that the reinforcement 17 in the longitudinal direction of the web has a cross-section tapering towards the end. The greatest thickness is in the vicinity of the greatest web constriction. The cross-sectional is always constant in the width, i.e. at right angles to the plane of the drawing.

In the case of the second embodiment of a reinforcement 17' shown in FIG. 3, the convexity is only on one side. It is mainly located on the side remote from the web 16 (FIG. 1). FIG. 4 shows a third embodiment of a reinforcement 17'', which has a substantially constant thickness in the central region at the maximum web constriction. The thickness reduction takes place towards the edges on either side and in linear manner to a predetermined residual thickness a.

The fourth embodiment of a reinforcement 18 according to FIGS. 5 and 6 comprises a sheet metal body 19 of uniform thickness, whose longitudinal edges are crimped over for cross-section thickening purposes. The crimp-overs 20, 21 are shorter than the sheet metal body, so that towards the edges there is a stepped constriction by the sheet metal thickness. In addition, the facing edges of the crimp-overs 20, 21 end at a predetermined distance from one another, so that they form a slot 22, which is used for cooling the web 16. As a result of the shaping of the crimp-overs 20, 21, it is possible to concentrate in a planned manner the pressure on the remaining surfaces of the adjacent parts.

The fifth embodiment of a reinforcement 23 according to FIGS. 7 and 8 also has a sheet metal body 24 of constant thickness. It is provided in the critical web constriction area with a support 25, which is connected by means of a positioning and mounting web 26 to an end face of the sheet metal body 24. The latter is constructed in one piece as a blank with a crimp-over on the root or base of the positioning and mounting web 26.

The seventh embodiment of a reinforcement is identical to the fourth embodiment of FIGS. 5 and 6 except that an additional longitudinal crimp over 20, 21 is included at each longitudinal side of the sheet metal body 18 to provide double folds preferably of different length to provide the convex cross-section reinforcing configuration with stepwise tapering in the longitudinal direction toward both ends of the invention.

The eighth embodiment of a reinforcement is identical to the embodiment of FIG. 1 except the U-shaped circular reinforcing borders 14, 15 of the passages 12, 13 are provided with correspondingly shaped widened portions in the area of the web between the passage openings which are crimped-over to form the layerwise reinforcement.

What we claim is:

1. A cylinder head gasket including at least two juxtaposed passage openings separated by a web area and comprising:
   a flat gasket plate of gasket material of uniform thickness;
   metallic, U-shaped, circular reinforcing borders for the passage openings; and
   a metallic, lamina-like reinforcement, separate from the flat plate of gasket material, positioned on the exterior of the gasket in the web area on one side of the gasket plate;
   wherein the reinforcement has an overall cross-sectional configuration tapering to either end of the reinforcement in the web longitudinal direction at least on one face of the reinforcement; and
   wherein the greatest thickness of the reinforcement is in the vicinity of the greatest constriction of the width of the web area between the passage openings; and
   wherein the reinforcement comprises a sheet metal body of uniform thickness with a flattened crimp-over at each longitudinal side edge of the sheet metal body which is shorter in the web longitudinal direction than said sheet metal body for forming adjacent layers of sheet metal body to provide a stepped convex longitudinal cross-section.

2. A cylinder head gasket according to claim 1, wherein the crimp-overs have a predetermined spacing from one another for forming a longitudinal slot between the passage openings for cylinder cooling.

3. A cylinder head gasket including at least two juxtaposed passage openings separated by a web area and comprising:
   a flat gasket plate of gasket material of uniform thickness;
   metallic, U-shaped, circular reinforcing borders for the passage openings; and
   a metallic, lamina like reinforcement, separate from the flat plate of gasket material, positioned on the exterior of the gasket in the web area on one side of the gasket plate;
   wherein the reinforcement has an overall cross-sectional configuration tapering to either end of the reinforcement in the web longitudinal direction at least on one face of the reinforcement; and
   wherein the greatest thickness of the reinforcement is in the vicinity of the greatest constriction of the width of the web area between the passage openings; and
   wherein the reinforcement comprises a sheet metal body of uniform thickness, wherein on one end face of said sheet metal body is provided a crimped over, narrow positioning and mounting web for support in the vicinity of the greatest web constriction and wherein the sheet metal body, the positioning and mounting web and the support are constructed in one piece.

4. A cylinder head gasket according to claim 3, wherein the positioning and mounting webs with support are arranged and crimped over in opposite directions on both end faces of the sheet metal body.

5. In a cylinder head gasket with a gasket plate which has at least two juxtaposed passage openings separated by a web, as well as metallic, circular reinforcing borders for the passage openings; a metallic, lamina-like reinforcement located in the web area between passage openings on one side of the gasket plate, comprising:
   a body of sheet metal said sheet metal having a uniform thickness, said body having flattened crimp overs to provide adjacent layers arranged to approximate a continuous convex surface, and which is defined by a stepped convex longitudinal cross-section tapering to either end in the web longitudinal direction at least on one face of the reinforcement, and wherein the greatest thickness of the reinforcement is in the vicinity of greatest constriction of the web area between the passage openings.

* * * * *